US007651962B2

(12) United States Patent
Kimura et al.

(10) Patent No.: US 7,651,962 B2
(45) Date of Patent: Jan. 26, 2010

(54) OIL FOR DUST ADSORPTION

(75) Inventors: Sumi Kimura, Kyoto (JP); Yasuyuki Kakara, Tokai (JP); Hirokazu Mitsuhashi, Kyoto (JP)

(73) Assignees: Unicharm Corporation, Shikokuchuo-shi, Ehime (JP); Sanyo Chemical Industries, Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 11/320,152

(22) Filed: Dec. 27, 2005

(65) Prior Publication Data

US 2006/0160447 A1 Jul. 20, 2006

(30) Foreign Application Priority Data

Dec. 28, 2004 (JP) ............................. 2004-381680
Aug. 26, 2005 (JP) ............................. 2005-246058

(51) Int. Cl.
*B32B 5/02* (2006.01)
*A47K 7/02* (2006.01)

(52) U.S. Cl. ......................... 442/100; 15/208; 15/209.1

(58) Field of Classification Search ................... 442/84, 442/97, 100
See application file for complete search history.

(56) References Cited

U.S. PATENT DOCUMENTS

| | | | | |
|---|---|---|---|---|
| 6,790,794 | B2 * | 9/2004 | Fereshtehkhou et al. | ...... 442/35 |
| 2003/0194452 | A1 * | 10/2003 | Agarwal et al. | ............. 424/734 |

FOREIGN PATENT DOCUMENTS

| | | | |
|---|---|---|---|
| JP | 59-129285 | | 7/1984 |
| JP | 6-220429 | | 8/1994 |
| JP | 2002-069435 | | 3/2002 |
| JP | 2003-055122 | | 2/2003 |
| JP | 2003334240 | A * | 5/2003 |
| JP | 2003-334504 | A | 11/2003 |

OTHER PUBLICATIONS

Database WPI Week 200344, Derwent Publication Ltd. London GB. AN 2003-461738. XP002466645.

* cited by examiner

*Primary Examiner*—Lynda Salvatore
(74) *Attorney, Agent, or Firm*—Darby & Darby P.C.

(57) ABSTRACT

An oil for dust adsorption that includes a base oil (A), a nonionic surfactant (B), and an allergen inactivation component (C). This oil for dust adsorption can be used favorably on cleaning and wiping implements containing a dry fibrous substrate, such as mops and wipers and the like.

7 Claims, No Drawings

OIL FOR DUST ADSORPTION

CROSS REFERENCE TO RELATED APPLICATION

This application is based upon and claims the benefit of priority from prior Japanese Application 2004-381680 filed on Dec. 28, 2004, and Japanese Application 2005-246058 filed on Aug. 26, 2005; the entire contents of which are incorporated by reference herein.

BACKGROUND OF THE INVENTION

1. Field of the Invention

The present invention relates to an oil for dust adsorption that exhibits an allergen inactivation action. More specifically, the invention relates to an oil for dust adsorption with an allergen inactivation action that is used by adhesion to a cleaning implement such as a dust adsorption mop, mat, or wiper.

2. Description of the Related Art

The causes of allergic diseases can include pollen, mites and their remains or excrement, pet hair from cats or dogs or the like, household dust, and certain foods. These substances that cause allergic diseases are known as allergens.

Allergens that afflict a large number of people indoors include mites, household dust, and pet hair. Conventionally, the use of cleaning appliances such as vacuum cleaners has been considered a good method of removing these allergens. However, in order to ensure satisfactory removal of these allergens to prevent the onset of allergic disease, vacuum cleaning must be repeated several times, which is very laborious.

As a result, in recent years, methods of inactivating and removing allergens have been proposed. However, because these methods require the dispersion or application of an allergen-inactivating reagent using a sprayer or the like, followed by subsequent removal of the reagent by either wiping or use of a vacuum cleaner, they still involve considerable labor (see Japanese Laid-Open Publication No. 2003-334504).

Furthermore, even if a dust cloth, a mop, or a wiper or the like is used to wipe away mites and the house dust that they inhabit, which represent the most common allergens responsible for allergic disease, because any allergens that fall from the cleaning implement have not been inactivated, they can cause further outbreaks of the allergic disease. Accordingly, these allergens need to be retained permanently on the cleaning implement, as well as being inactivated.

An oil for dust adsorption can be applied to a cleaning implement such as a mop or a wiper to remove household dust. However, most reagents used for inactivating allergens are water-soluble materials, meaning dissolving or dispersing these reagents within a dust adsorption oil has proved difficult.

SUMMARY OF THE INVENTION

The inventors of the present invention discovered that by dispersing or dissolving an allergen inactivation component in a base oil using a nonionic surfactant, the allergen inactivation component could be adhered stably to the fibrous substrate of a cleaning implement such as a mop.

Accordingly, the present invention relates to an oil for dust adsorption that comprises a base oil (A), a nonionic surfactant (B), and an allergen inactivation component (C).

Another aspect of the present invention relates to a fiber product for dust adsorption that has been treated with the oil for dust adsorption according to the above aspect of the present invention.

An oil for dust adsorption according to the present invention exhibits excellent dust adsorption properties, and also has the effect of inactivating any adsorbed allergens.

DETAILED DESCRIPTION OF THE EMBODIMENTS

In a preferred embodiment of the oil for dust adsorption (hereafter also abbreviated as simply "the oil"), there are no particular restrictions on the base oil (A), and suitable examples include mineral oils and refined oils produced therefrom, hydrogenated and/or cracked oils produced from such mineral oils or refined oils, silicone oil, and plant-based or animal-based oils such as canola oil and castor oil. These oils can be used either alone, or in mixtures of two or more different oils.

Preferred oils among those listed above include mineral oils and refined oils produced therefrom, and hydrogenated and/or cracked oils produced from such mineral oils or refined oils.

The kinematic viscosity (hereafter also abbreviated as simply "viscosity") of the component (A) at 30° C. (the value measured using an Ubbelohde viscometer in accordance with JIS Z8803-1991, 5.2.3) is typically within a range from 10 to 250 $mm^2/S$, and is preferably from 35 to 200 $mm^2/s$. If the kinematic viscosity of the component (A) exceeds 250 $mm^2/s$, then when the oil for dust adsorption is used with a dust adsorption mop or the like, there is a danger that the oil may adhere to the floor or other surfaces, thereby impairing the performance of the oil for dust adsorption.

In a preferred embodiment, suitable examples of the nonionic surfactant (B) include aliphatic alcohol alkylene oxide (hereafter, the term alkylene oxide may also be abbreviated as "AO") adducts (B1), and aliphatic carboxylate esters (fatty acid ester compounds) (B2).

In this description, the term "aliphatic alcohol" includes both aliphatic alcohols and alicyclic alcohols, and the term "aliphatic carboxylic acid" includes both aliphatic carboxylic acids and alicyclic carboxylic acids.

The aliphatic alcohol used for generating the aforementioned adduct (B1) is preferably an aliphatic alcohol (x) of 1 to 24 carbon atoms, and may be either a synthetic alcohol or a natural alcohol, with suitable examples including those listed below:

aliphatic monohydric alcohols of 1 to 24 carbon atoms (x1) (including aliphatic saturated monohydric alcohol such as methanol, 2-ethylhexyl alcohol, lauryl alcohol, palmityl alcohol, and isostearyl alcohol; and aliphatic unsaturated monohydric alcohols such as oleyl alcohol), aliphatic polyhydric (dihydric to hexahydric) alcohols of 1 to 24 carbon atoms or condensation products thereof (x2) (such as 1,6-hexanediol, neopentyl glycol, glycerol, trimethylolpropane, pentaerythritol, sorbitol, and sorbitan), and cyclic aliphatic monohydric alcohols of 1 to 24 carbon atoms (x3) (such as ethylcyclohexyl alcohol, propylcyclohexyl alcohol, octylcyclohexyl alcohol, nonylcyclohexyl alcohol, and adamantyl alcohol).

Examples of the AO used for generating the adduct (B1) include AO compounds of 2 to 8 carbon atoms, such as ethylene oxide (hereafter abbreviated as "EO"), propylene oxide (hereafter abbreviated as "PO"), 1,2- or 1,3-butylene oxide, tetrahydrofuran, and styrene oxide. Of these, EO and PO are preferred.

The form of the AO addition may involve either random or block addition. From the viewpoint of ensuring favorable solubility in the base oil, the number of mols added of the AO is preferably within a range from 1 to 50 mols, even more preferably from 1 to 30 mols, and most preferably from 1 to 20 mols.

Examples of the alkyl groups (the alkyl groups derived from the alcohol (x)) within the adduct (B1) include saturated or unsaturated alkyl groups of 1 to 24 carbon atoms. These alkyl groups may be either derived from natural oils and fats such as palm oil, beef tallow, canola oil, rice bran oil, and fish oil, or may be synthesized.

Examples of the aliphatic carboxylic acid (a) used for generating the fatty acid ester compound (B2) include the acids listed below:

aliphatic monocarboxylic acids of 1 to 24 carbon atoms (a1) (including aliphatic saturated monocarboxylic acids such as formic acid, ethanoic acid, propionic acid, lauric acid, palmitic acid, stearic acid, isostearic acid, and isoarachidic acid; and aliphatic unsaturated monocarboxylic acids such as oleic acid and erucic acid), and aliphatic dicarboxylic acids of 1 to 24 carbon atoms (a2) (including aliphatic hydrocarbon-based saturated dicarboxylic acids such as adipic acid and elaidic acid).

aliphatic monohydric alcohols of 8 to 32 carbon atoms (xx1) (including aliphatic saturated monohydric alcohols such as octyl alcohol, 2-ethylhexyl alcohol, lauryl alcohol, palmityl alcohol, and isostearyl alcohol; and aliphatic unsaturated monohydric alcohols such as oleyl alcohol), aliphatic polyhydric (dihydric to hexahydric) alcohols of 3 to 24 carbon atoms or condensation products thereof (xx2) (such as 1,6-hexanediol, neopentyl glycol, glycerol, trimethylolpropane, pentaerythritol, sorbitol, and sorbitan), AO adducts (xx3) of aliphatic monohydric alcohols of 1 to 24 carbon atoms (x1) (such as a 7 mol EO adduct of lauryl alcohol), AO adducts (xx4) of aliphatic polyhydric alcohols of 1 to 24 carbon atoms (x2), and polyalkylene glycols (xx5).

Specific examples of the component (B2) include polyhydric alcohol fatty acid ester AO adducts (namely, fatty acid esters of AO adducts of polyhydric alcohols) (such as polyoxyethylene glycerol dioleate and polyoxyethylene sorbitan trioleate), EO adducts of castor oil, EO adducts of hardened castor oil; esters formed from (a1) and (xx1) compounds (such as 2-ethylhexyl stearate, isodecyl stearate, isostearyl oleate, isoeicosyl stearate, isoeicosyl oleate, isotetracosyl oleate, isoarachidyl oleate, isostearyl palmitate, and oleyl oleate); esters formed from (a1) and (xx2) compounds (such as glycerol dioleate, pentaerythritol tetraoleate, and sorbitan monooleate); esters formed from (a2) and (x1) compounds (including adipate esters such as dioleyl adipate and diisotridecyl adipate); esters formed from (a1) and (xx3) compounds (such as the ester of a 2 mol EO adduct of Dobanol 23 (a synthetic alcohol manufactured by Mitsubishi Chemical Corporation) and lauric acid, the ester of a 2 mol PO adduct of isotridecyl alcohol and lauric acid, and the diester of a 2 mol EO adduct of Dobanol 23 and adipic acid); esters formed from (a1) and (xx5) compounds (such as polyethylene glycol mono(di)stearate and polyethylene glycol mono(di)oleate); and esters formed from (a2) and (xx3) compounds (such as the adipate ester of a 7 mol EO adduct of lauryl alcohol). Moreover, in addition to the compounds listed above, carboxylate ester compounds comprising arbitrary mixtures of carboxylic acid components such as the aforementioned (a1) and (a2) compounds, and alcohol components such as the aforementioned (x1), (x2), (x3), (xx3), (xx4), and (xx5) compounds can also be used.

Of these nonionic surfactants (B), aliphatic alcohol AO adducts (B1) are preferred in terms of the ease of dispersion or dissolution of the allergen inactivation component (C) within the base oil (A), and aliphatic alcohol AO adducts of 1 to 24 carbon atoms (and most preferably 8 to 24 carbon atoms) (B11), represented by a general formula (1) shown below, are even more desirable.

$$R^1—(OA)_k—OH \qquad (1)$$

In the formula (1), $R^1$ represents an aliphatic hydrocarbon group of 1 to 24 carbon atoms or an alicyclic hydrocarbon group of 3 to 24 carbon atoms, A represents at least one type of alkylene group of at least 2 carbon atoms, and k represents either 0 or an integer of 1 or greater, with an average value within a range from 1 to 50. In a particularly preferred configuration, $R^1$ represents a straight-chain or branched alkyl group or cycloalkyl group of 1 to 24 carbon atoms (and even more preferably from 8 to 24 carbon atoms), A represents an alkylene group of 2 to 8 carbon atoms, and k represents either 0 or an integer of 1 or greater, with an average value within a range from 1 to 20.

In a similar manner to that described above, an adduct (B11) of the general formula (1) is an aliphatic alcohol AO adduct, obtained by adding an alkylene oxide (B1b) to an aliphatic alcohol (B1a), and may also comprise a mixture of two or more different adducts.

In the above general formula (1), $R^1$ is a residue of the aliphatic alcohol (B1a), and represents an aliphatic hydrocarbon group (such as an alkyl group, alkenyl group, or alkadienyl group), typically of 1 to 24 carbon atoms, or an alicyclic hydrocarbon group (such as a cycloalkyl group or polycyclic hydrocarbon group) of 3 to 24 carbon atoms. In those cases where the number of carbon atoms within $R^1$ is 3 or greater, $R^1$ may also represent a mixture of two or more straight-chain or branched groups. Provided the number of carbon atoms falls within the above range, satisfactory compatibility with the component (A) can be achieved.

Specific examples of $R^1$ include alkyl groups such as methyl, ethyl, isopropyl, butyl, octyl, nonyl, decyl, lauryl, tridecyl, myristyl, cetyl, stearyl, nonadecyl, 2-ethylhexyl, and 2-ethyloctyl groups; alkenyl groups such as octenyl, decenyl, dodecenyl, tridecenyl, pentadecenyl, oleyl, and gadoleyl groups; alkadienyl groups such as a linoleyl group; cycloalkyl groups such as ethylcyclohexyl, propylcyclohexyl, octylcyclohexyl, and nonylcyclohexyl groups; and polycyclic hydrocarbon groups such as an adamantyl group.

In the formula (1), A represents an alkylene group of at least 2 carbon atoms, and preferably from 2 to 8 carbon atoms, and OA represents an alkylene oxide (AO) of at least 2 carbon atoms, and preferably from 2 to 8 carbon atoms. Specific examples of this alkylene oxide, including preferred examples, include the same compounds as those listed in relation to the AO of the adduct (B1).

In the formula (1), k corresponds with the number of mols added of the alkylene oxide (B1b), and on average, is an integer within a range from 1 to 50, preferably from 1 to 20, even more preferably from 1 to 15, and most preferably from 1 to 10. If k exceeds 50, then the compatibility with the base oil (A) tends to be prone to deterioration.

The aforementioned aliphatic alcohol (B1 a) supplies the $R^1$ residue, and is typically an alcohol of 1 to 24, preferably from 8 to 24, and even more preferably from 8 to 18, carbon atoms. Both natural alcohols and synthetic alcohols (such as Ziegler alcohols and oxo alcohols) are suitable.

Specific examples include saturated aliphatic alcohols such as octyl alcohol, nonyl alcohol, decyl alcohol, undecyl alcohol, dodecyl alcohol, tridecyl alcohol, tetradecyl alcohol, hexadecyl alcohol, octadecyl alcohol, and nonadecyl alcohol;

unsaturated aliphatic alcohols such as octenyl alcohol, decenyl alcohol, dodecenyl alcohol, tridecenyl alcohol, pentadecenyl alcohol, oleyl alcohol, gadoleyl alcohol, and linoleyl alcohol; and cyclic aliphatic alcohols such as ethylcyclohexyl alcohol, propylcyclohexyl alcohol, octylcyclohexyl alcohol, nonylcyclohexyl alcohol, and adamantyl alcohol. Either one, or a mixture of two or more of these alcohols can be used. These aliphatic alcohols are preferably primary or secondary alcohols, and primary alcohols are particularly preferred. The alkyl group portion (the $R^1$ residue) of the aliphatic alcohol may be either a straight chain or branched.

Particularly preferred alcohols amongst those listed above include isodecyl alcohol, dodecyl alcohol, tridecyl alcohol, isotridecyl alcohol, tetradecyl alcohol, hexadecyl alcohol, and octadecyl alcohol.

Adducts (B11) of the general formula (1) produced directly from an aliphatic alcohol (B1a) and an alkylene oxide (B1b) are preferred, as the associated production process is simple. Here, the term "produced directly" means that no operations are conducted using rectification or the like to fractionate any unreacted alcohol or adducts in which the number of mols of oxide added is different, but rather, the product obtained is used directly as the aforementioned adduct. However, the stripping of unreacted alkylene oxide or low boiling point materials using a simple operation not intended as a fractionation is not included within the definition of fractionation as used above.

From the viewpoint of enhancing the oil separability from wastewater for those situations where waste liquids containing the oil for dust adsorption are treated, and also from the viewpoint of preventing a problem wherein materials used for wrapping products such as wipers to which the oil for dust adsorption has been applied undergo wrinkling as a result of unreacted alcohol contained within the oil for dust adsorption, the nonionic surfactant (B) is preferably an adduct (B11) represented by the general formula (1), which also satisfies either the formula (2) or (3) shown below, and has a narrower molecular weight distribution than normal, with the value for the Weibull distribution parameter c, determined using a formula (4) shown below, being no more than 1.0.

$$Mw/Mn \leqq 0.030 \times \mathrm{Ln}(v)+1.010 \text{ (wherein, } v<10) \quad (2)$$

$$Mw/Mn \leqq -0.026 \times \mathrm{Ln}(v)+1.139 \text{ (wherein, } v \geqq 10) \quad (3)$$

$$c=(v+n_0/n_{00}-1)/[\mathrm{Ln}(n_{00}/n_0)+n_0/n_{00}-1] \quad (4)$$

In the formulas (2) and (3), Mw represents the weight average molecular weight, Mn represents the number average molecular weight, and v represents the average number of mols of the alkylene oxide (B1b) added to each mol of the aliphatic alcohol of 1 to 24 carbon atoms (B1a), which corresponds with the average value of k representing the number of mols added of the alkylene oxide in the aforementioned general formula (1). Ln(v) represents the natural logarithm of v.

If neither the formula (2) nor the formula (3) is satisfied, that is, if the molecular weight distribution for the surfactant molecule broadens, then there is a danger that satisfactory water separability may be unobtainable.

Surfactants for which the value of Mw/Mn satisfies either the formula (2') or (3') shown below are even more desirable.

$$Mw/Mn \leqq 0.031 \times \mathrm{Ln}(v)+1.000 \text{ (wherein, } v<10) \quad (2')$$

$$Mw/Mn \leqq -0.026 \times \mathrm{Ln}(v)+1.129 \text{ (wherein, } v \geqq 10) \quad (3')$$

The relational expression (4) is derived from the Weibull distribution formula (7) shown below.

$$v=c \times \mathrm{Ln}(n_{00}/n_0)-(c-1) \times (1-n_0/n_{00}) \quad (7)$$

From the viewpoint of water separability, the distribution parameter c in the relational expression (4) is preferably no more than 1.0, and is even more preferably 0.7 or less.

In the formula (4), a smaller value of the distribution parameter c, that is, a smaller quantity of unreacted aliphatic alcohol, indicates a narrower molecular weight distribution.

Generally, in those cases where the aliphatic alcohol AO adduct (B11) comprises solely ethylene oxide as the AO, adducts (B11) which satisfy either the formula (5) or (6) shown below, and exhibit a narrow molecular weight distribution wherein the Weibull distribution parameter c determined using the aforementioned formula (4) is no more than 1.0 are particularly desirable.

$$Mw/Mn \leqq 0.018 \times \mathrm{Ln}(v)+1.015 \text{ (wherein, } v<10) \quad (5)$$

$$Mw/Mn \leqq -0.026 \times \mathrm{Ln}(v)+1.116 \text{ (wherein, } v \geqq 10) \quad (6)$$

Moreover, when ethylene oxide is the sole AO, it is even more preferable from the viewpoint of water separability that the adduct satisfies either the formula (5') or (6') shown below.

$$Mw/Mn \leqq 0.020 \times \mathrm{Ln}(v)+1.010 \text{ (wherein, } v<10) \quad (5')$$

$$Mw/Mn \leqq -0.023 \times \mathrm{Ln}(v)+1.113 \text{ (wherein, } v \geqq 10) \quad (6')$$

Although there are no particular restrictions on the method of producing the aliphatic alcohol AO adduct (B11), as described above, an adduct "produced directly" by adding an alkylene oxide to an aliphatic alcohol (B1a) is preferred. A specific example of a method of producing the adduct (B11) is disclosed in Japanese Laid-Open Publication No. 2002-069435.

The aliphatic alcohol AO adduct (B1) may be subjected to either removal of residual catalyst material by adsorption treatment with an adsorbent such as Kyoward 600 (manufactured by Kyowa Chemical Industry Co., Ltd.), or neutralization treatment using an oxycarboxylic acid (lactic acid) or the like, as disclosed in Japanese Laid-Open Publication No. Sho 56-112931 and Japanese Examined Patent Publication No. Hei 2-53417, either prior to blending with the base oil (A) and the allergen inactivation component (C) or following blending, or may also be used with the residual catalyst still present within the adduct.

Specific examples of preferred aliphatic alcohol AO adducts (B11) represented by the general formula (1) include a 7 mol EO adduct of isodecyl alcohol, 2 mol EO, 2 mol PO, 4 mol EO adduct of isodecyl alcohol, EO adduct of lauryl alcohol, 10 mol EO adduct of lauryl alcohol, and 2 mol EO, 2 mol PO, 4 mol EO adduct of lauryl alcohol.

Allergens are the substances that cause allergic diseases, and include pollen, mites and their remains or excrement, pet hair from cats or dogs or the like, household dust, and certain foods, and the allergen inactivation component (C) is a compound that suppresses the allergen activity responsible for causing the allergy.

Examples of this component (C) include the allergen inactivation agents disclosed in Japanese Laid-Open Publication No. 2003-55122, such as components (such as oleuropein) (C1) extracted from one or more plants selected from the genus *Olea* (olive) or the genus *Ligustrum* (such as *ligustrum obtusifolium, ligustrum tschonoskii, ligustrum ovafolium, ligustrum hisauchii, ligustrum ibota, ligustrum japonicum*, and *ligustrum lucidum*) of the family Oleaceae. However, there are no particular restrictions on this component (C) provided it can be blended stably with the base oil (A) using the nonionic surfactant (B).

Examples of possible allergen inactivation components other than the components (C1) described above include pyrethroid-based compounds (such as natural pyrethrins, phenothrin, and permethrin), organic phosphorus compounds (such as fenitrothion, malathion, fenthion, and diazinon), as well as benzyl alcohol, benzyl benzoate, phenyl salicylate, cinnamaldehyde, dicofol, chlorobenzilate, hexythiazox, hyssop oil, carrot seed oil, tannic acid, gallic acid, and tea extracts. These components may be used either alone, or in combinations of two or more different components, and may also be combined with the aforementioned plant extracts (C1).

From the viewpoint of ensuring favorable dispersion or dissolution of the allergen inactivation component, the quantity of the nonionic surfactant (B) within each 100 parts by mass of the oil for dust adsorption is preferably within a range from 1 to 50 parts by mass (that is, from 1 to 50% by mass), even more preferably from 5 to 40 parts by mass, and most preferably from 10 to 30 parts by mass.

The quantity of the allergen inactivation component (C) within each 100 parts by mass of the oil is preferably within a range from 0.01 to 15 parts by mass (that is, from 0.01 to 15% by mass), even more preferably from 0.01 to 5 parts by mass, and most preferably from 0.02 to 5 parts by mass. Provided the quantity falls within this range, a favorable allergen inactivation effect can be obtained. This component (C) is either dissolved or dispersed within the oil.

If required, the oil may also include other surfactants (including anionic surfactants such as higher alcohol phosphate esters, higher alcohol sulfate esters, and higher alcohol sulfonates; cationic surfactants; and amphoteric surfactants), alcohols (such as methanol, ethanol, isopropyl alcohol, and butanol), charge control agents (such as phosphate-based charge control agents, phosphite-based charge control agents, and fatty acid soaps), other additives (such as fragrances, sequestering agents, antioxidants, ultraviolet absorbers, and fungicides), and water.

The blend quantity of the other surfactants described above is preferably no more than 10% by mass of the oil, and quantities of 8% by mass or less are even more desirable.

The blend quantity of the aforementioned charge control agents within the oil is preferably no more than 10% by mass, and even more preferably 5% by mass or less. The blend quantity of other additives is preferably no more than 3% by mass, and even more preferably 1% by mass or less. The blend quantity of water within the oil is preferably no more than 10% by mass, and even more preferably 5% by mass or less.

The oil comprises the aforementioned components (A), (B), and (C), together with any other components that are added as required, and is produced by mixing the components together to generate a uniform mixture, either at room temperature or under heating if required. There are no particular restrictions on the order in which the components are blended, nor on the blending method employed.

The kinematic viscosity of the oil is measured in accordance with JIS Z8803-1991 (5.2.3 Ubbelohde viscometer), and the value at 30° C. preferably falls within a range from 10 to 300 $mm^2/s$, and even more preferably from 35 to 200 $mm^2/s$. Provided the kinematic viscosity of the oil is at least 10 $mm^2/s$, the transferability of the oil remains small. Accordingly, if the oil is used with a mop, then during cleaning, there is no danger of the oil transferring from the mop to the object from which the dust is being removed, such as the floor or a piece of furniture, and leaving a sticky residue on the object. Similarly, if the oil is used with a mat, there is no danger of the oil being transferred to the soles of shoes and subsequently soiling the floor. On the other hand, provided the kinematic viscosity of the oil is no more than 300 $mm^2/s$, favorable dust adsorption characteristics can be achieved.

The oil is usually adhered to a fibrous material and then used as a dust-adsorbing fiber product. Suitable forms for these fiber products include mats, mops, rugs, and wiping cloths. Of these, dry fiber products, such as indoor cleaning and wiping implements containing a dry fibrous substrate are preferred. Examples of suitable fibers include cellulose-based fibers (such as cotton, mercerized cotton, and regenerated cellulose fiber), polyvinyl alcohol fibers, acrylic fibers, polyamide fibers, polyester fibers, and polypropylene fibers, as well as mixed fibers thereof. These fibers can be employed in a variety of different forms, including twisted yarn, string, woven fabric such as cloth, tufted fabric such as mats, knitted fabric, and nonwoven fabric.

Specific examples of the dust targeted by these dust-adsorbing fiber products include pollen, mites and their remains or excrement, pet hair from cats or dogs or the like, household dust, and certain food residues, found within the home, shops, or offices or the like.

Although there are no particular restrictions on the method of applying the oil to the fiber product, in one suitable method, the oil is deposited onto the fibers, either in neat form or following mechanical dispersion after the addition of water, either at room temperature or, if required, under heating at a temperature of no more than 90° C. Suitable methods for depositing the oil onto the fibers include roll coating, padding, immersion, and spray methods.

The quantity of oil adhered to the fibers, calculated as a solid fraction of oil per 100 g of dry fiber, is typically within a range from 0.3 to 40 g, and is preferably from 1 to 25 g.

EXAMPLES

As follows is a more detailed description of the present invention using a series of examples, but the present invention is in no way limited by the examples presented below. In the following production examples, and the examples and comparative examples, the units “parts” refer to parts by weight, and “%” refers to a weight percentage.

The method used for measuring the molecular weight by gel permeation chromatography (GPC), and the method used for measuring the unreacted alcohol content using gas chromatography (GC) are described below. Using the measurement conditions listed below, the reaction products from each of the production examples for the component (B11) were measured, and values were determined for Mw/Mn, the quantity of unreacted aliphatic alcohol, and the distribution parameter c in the formula (4).

<<GPC Measurement Conditions>>

Column: TSK gel SuperH4000
TSK gel SuperH3000
TSK gel SuperH2000
(all manufactured by Tosoh Corporation)
Column temperature: 40° C.
Detector: RI
Solvent: tetrahydrofuran
Flow rate: 0.6 ml/minute
Sample concentration: 0.25% by mass
Injection volume: 10 μl
Standard: polyoxyethylene glycol
(TSK standard polyethylene oxide, manufactured by Tosoh Corporation)
Data processing device: SC-8020 (manufactured by Tosoh Corporation)

<<GC Measurement Conditions>>

Apparatus: gas chromatograph GC-14B (manufactured by Shimadzu Corporation)

Detector: FID

Column: glass column (internal diameter=approximately 3 mm, length=approximately 2 m)

Column filler: silicon GE SE-50 5%

Rate of temperature increase: 90 to 280° C. at 4° C./minute

Sample: 50% acetone solution

Injection volume: 1 μl

Quantitative determination: an aliphatic alcohol with 2 or 3 fewer carbon atoms than the aliphatic alcohol used in the synthesis of the component (B11) was used as an internal standard to enable quantitative determination.

Production Example 1

A stainless steel autoclave fitted with a stirrer and a temperature control function was charged with 186 parts (1 mol) of lauryl alcohol, 0.04 parts of magnesium perchlorate, and 0.01 parts of magnesium sulfate heptahydrate, and following flushing of the mixed system with nitrogen, the system was dewatered under reduced pressure (approximately 20 mmHg) at 120° C. for one hour. Subsequently, 88 parts (2 mols) of EO was introduced at 150° C., so as to alter the gauge pressure to a value within a range from 0.1 to 0.3 MPa. The Weibull distribution parameter c for the resulting adduct was 0.42, and the quantity of unreacted alcohol was 2.2%.

0.3 parts of potassium hydroxide was added to this adduct, and 220 parts (5 mols) of EO was then reacted at 150° C. 3 parts of Kyoward 600 (manufactured by Kyowa Chemical Industry Co., Ltd., this also applies below) was then added to the reaction product, and following catalyst adsorption treatment at 90° C., the reaction mixture was filtered.

The Mw/Mn value for the resulting reaction product was 1.015 (the calculated upper limit for Mw/Mn required to satisfy the formula (5') is 1.049), the quantity of unreacted aliphatic alcohol was 0.02%, and the distribution parameter c calculated using the formula (4) was 0.92.

Production Example 2

With the exceptions of replacing the 0.04 parts of magnesium perchlorate and 0.01 parts of magnesium sulfate from the production example 1 with 0.04 parts of magnesium perchlorate and 0.01 parts of aluminum perchlorate nonahydrate (the distribution parameter c for the resulting adduct was 0.38, and the quantity of unreacted alcohol was 1.7%), and altering the quantity of EO added in the presence of the alkali catalyst from 220 parts to 352 parts (8 mols), preparation was conducted in the same manner as the production example 1.

The Mw/Mn value for the resulting reaction product was 1.052 (the calculated upper limit for Mw/Mn required to satisfy the formula (6') is 1.056), and the quantity of unreacted aliphatic alcohol was undetectable (detection limit: 0.001%).

Production Example 3

A stainless steel autoclave fitted with a stirrer and a temperature control function was charged with 186 parts (1 mol) of lauryl alcohol and 0.05 parts of magnesium perchlorate, and following flushing of the mixed system with nitrogen, the system was dewatered under reduced pressure (approximately 20 mmHg) at 120° C. for one hour. Subsequently, 88 parts (2 mols) of EO was introduced at 150° C., so as to alter the gauge pressure to a value within a range from 0.1 to 0.3 MPa. The distribution parameter c for the resulting adduct was 0.60, and the quantity of unreacted alcohol was 4.5%.

1.3 parts of potassium hydroxide was added to this adduct, and 116 parts (2 mols) of PO and then 176 parts (4 mols) of EO were introduced, in that order, at 130° C., so as to alter the gauge pressure to a value within a range from 0.1 to 0.3 MPa. 3 parts of Kyoward 600 was then added to the reaction product, and following catalyst adsorption treatment at 90° C., the reaction mixture was filtered.

The Mw/Mn value for the resulting reaction product was 1.067 (the calculated upper limit for Mw/Mn required to satisfy the formula (3) is 1.072), the quantity of unreacted aliphatic alcohol was 0.006%, and the distribution parameter c calculated using the formula (4) was 0.91.

Production Example 4

A stainless steel autoclave fitted with a stirrer and a temperature control function was charged with 158 parts (1 mol) of isodecyl alcohol, 0.04 parts of magnesium perchlorate, and 0.01 parts of magnesium sulfate heptahydrate, and following flushing of the mixed system with nitrogen, the system was dewatered under reduced pressure (approximately 20 mmHg) at 120° C. for one hour. Subsequently, 88 parts (2 mols) of EO was introduced at 150° C., so as to alter the gauge pressure to a value within a range from 0.1 to 0.3 MPa. The Weibull distribution parameter c for the resulting adduct was 0.42, and the quantity of unreacted alcohol was 2.2%.

0.3 parts of potassium hydroxide was added to this adduct, and 220 parts (5 mols) of EO was then reacted at 150° C. 3 parts of Kyoward 600 was then added to the reaction product, and following catalyst adsorption treatment at 90° C., the reaction mixture was filtered.

The Mw/Mn value for the resulting reaction product was 1.048 (the calculated upper limit for Mw/Mn required to satisfy the formula (5') is 1.049), the quantity of unreacted aliphatic alcohol was 0.02%, and the distribution parameter c calculated using the formula (4) was 0.92.

Production Example 5

A stainless steel autoclave fitted with a stirrer and a temperature control function was charged with 186 parts (1 mol) of lauryl alcohol and 0.3 parts of potassium hydroxide, and following flushing of the mixed system with nitrogen, the system was dewatered under reduced pressure (approximately 20 mmHg) at 120° C. for one hour. Subsequently, 440 parts (10 mols) of EO was introduced at 150° C., so as to alter the gauge pressure to a value within a range from 0.1 to 0.3 MPa. 3 parts of Kyoward 600 was then added to the reaction product, and following catalyst adsorption treatment at 90° C., the reaction mixture was filtered.

The Mw/Mn value for the resulting reaction product was 1.101 (the calculated upper limit for Mw/Mn required to satisfy the formula (6') is 1.056), the quantity of unreacted aliphatic alcohol was 0.7%, and the distribution parameter c calculated using the formula (4) was 3.26.

Production Example 6

A stainless steel autoclave fitted with a stirrer and a temperature control function was charged with 186 parts (1 mol) of lauryl alcohol, and following flushing of the mixed system with nitrogen, the system was dewatered under reduced pressure (approximately 20 mmHg) at 120° C. 0.3 parts of boron trifluoride diethyl ether was then added at 40° C., and the mixed system was once again flushed with nitrogen. Subsequently, 88 parts (2 mols) of EO, 116 parts (2 mols) of PO, and 264 parts (6 mols) of EO were introduced, in that order, at 50° C. so as to alter the gauge pressure to approximately 0.1 MPa, and the system was then neutralized with alkali.

The Mw/Mn value for the resulting reaction product was 1.096 (the calculated upper limit for Mw/Mn required to satisfy the formula (3) is 1.072), the quantity of unreacted aliphatic alcohol was 0.04%, and the distribution parameter c calculated using the formula (4) was 1.60.

In this production example 6, approximately 7% of polyalkylene glycol was produced as a by-product.

Production Example for the Allergen Inactivation Component

An olive leaf extract disclosed in Japanese Laid-Open Publication No. 2003-55122 (produced by placing 20 g of olive leaves in 100 g of water, grinding the mixture up using a mixer, and then filtering the resulting liquid through a filter paper) was dried, yielding an allergen inactivation component.

Example 1

The components listed below were placed in a mixing tank fitted with a paddle stirrer, and were then mixed at 20 to 30° C., yielding 1,000 parts of a uniform yellow liquid oil (1).

| | |
|---|---|
| mineral oil (viscosity at 30° C.: 30 $mm^2/s$) | 850 parts |
| lauryl alcohol 7 mol EO adduct (production example 1) | 50 parts |
| sorbitan trioleate 20 mol EO adduct | 65 parts |
| methanol 5 mol EO adduct | 5 parts |
| allergen inactivation component | 2 parts |
| water | 28 parts |

Example 2

Using the components listed below, 1,000 parts of a uniform yellow liquid oil (2) was prepared in the same manner as the example 1.

| | |
|---|---|
| mineral oil (viscosity at 30° C.: 95 $mm^2/s$) | 860 parts |
| lauryl alcohol 10 mol EO adduct (production example 2) | 50 parts |
| sorbitan monooleate | 45 parts |
| coconut oil fatty acid diethanolamide | 5 parts |
| allergen inactivation component | 4 parts |
| water | 30 parts |
| ethanol | 6 parts |

Example 3

Using the components listed below, 1,000 parts of a uniform yellow liquid oil (3) was prepared in the same manner as the example 1.

| | |
|---|---|
| mineral oil (viscosity at 30° C.: 110 $mm^2/s$) | 850 parts |
| hardened castor oil | 15 parts |
| lauryl alcohol 2 mol EO, 2 mol PO, 4 mol EO adduct (production example 3) | 40 parts |
| lauryl alcohol 2 mol EO adduct phosphate ester | 5 parts |
| sorbitan monooleate | 50 parts |
| sorbitan trioleate 20 mol EO adduct | 30 parts |
| allergen inactivation component | 3 parts |
| water | 7 parts |

Example 4

Using the components listed below, 1,000 parts of a uniform yellow liquid oil (4) was prepared in the same manner as the example 1.

| | |
|---|---|
| mineral oil (viscosity at 30° C.: 120 $mm^2/s$) | 800 parts |
| lauryl alcohol 7 mol EO adduct (production example 1) | 25 parts |
| isodecyl alcohol 7 mol EO adduct (production example 4) | 30 parts |
| hardened castor oil 20 mol EO adduct | 30 parts |
| sorbitan monooleate | 70 parts |
| allergen inactivation component | 10 parts |
| water | 35 parts |

Example 5

Using the components listed below, 1,000 parts of a uniform yellow liquid oil (5) was prepared in the same manner as the example 1.

| | |
|---|---|
| mineral oil (viscosity at 30° C.: 95 $mm^2/s$) | 860 parts |
| lauryl alcohol 10 mol EO adduct (production example 5) | 50 parts |
| sorbitan monooleate | 45 parts |
| coconut oil fatty acid diethanolamide | 5 parts |
| allergen inactivation component | 4 parts |
| water | 30 parts |
| ethanol | 6 parts |

Comparative Example 1

Using the components listed below, 1,000 parts of a uniform yellow liquid oil (6) was prepared in the same manner as the example 1.

| | |
|---|---|
| mineral oil (viscosity at 30° C.: 95 $mm^2/s$) | 900 parts |
| cetyl alcohol 3 mol EO adduct phosphate diethanolamine salt | 80 parts |
| allergen inactivation component | 4 parts |
| water | 10 parts |
| ethanol | 6 parts |

Comparative Example 2

Using the components listed below, 1,000 parts of a uniform yellow liquid oil (7) was prepared in the same manner as the example 1.

| | |
|---|---|
| mineral oil (viscosity at 30° C.: 265 $mm^2/s$) | 800 parts |
| hardened castor oil | 15 parts |
| lauryl alcohol 2 mol EO, 2 mol PO, 4 mol EO adduct (production example 6) | 40 parts |
| lauryl alcohol 2 mol EO adduct phosphate ester | 5 parts |
| sorbitan monooleate | 80 parts |
| sorbitan trioleate 20 mol EO adduct | 50 parts |
| water | 10 parts |

Performance Testing

Using the oils (1) through (7) obtained in the aforementioned examples and comparative examples, tests were conducted to ascertain the performance of each oil as an oil for dust adsorption. The results are shown in Table 1.

TABLE 1

| | | Evaluation of performance as an oil for dust adsorption | | | |
|---|---|---|---|---|---|
| Oil | Kinematic viscosity (*) $mm^2/s$ | Dust adhesion | Stability over time | Allergen inactivation | Ease of wastewater treatment |
| (1) | 35 | A | A | A | A |
| (2) | 105 | A | A | A | A |
| (3) | 150 | A | A | A | A |
| (4) | 200 | A | A | A | A |
| (5) | 100 | A | A | A | B |
| (6) | 130 | A | C | A | D |
| (7) | 275 | B | B | C | B |

(*) Kinematic viscosity at 30° C.

<Conditions for Oil Deposition Treatment>

A dust adsorption mop formed from a mixture of acrylic and rayon fibers (mass ratio: acrylic/rayon=70/30) that had not been treated with oil was used as the untreated mop.

A solution of oil that had been diluted 20-fold with toluene was sprayed onto the untreated mop, and then air dried, yielding an oil-treated mop. The quantity of oil adhered to the oil-treated mop, calculated as a solid fraction relative to the mass of the mop, was 10%.

<Measurement Methods>

Dust Adhesion. The oil-treated mop was cut into strips of length 5 cm, and 3 g of these mop strips were combined with a 4-fold mass excess of JIS class 2 test dust (quartz sand for test dust in accordance with JIS Z 8901) in a plastic bag, and the mixture was shaken for one minute. Subsequently, the sample was placed on top of a JIS sieve (20 mesh: a JIS Z 8801 standard sieve) and shaken for 10 minutes at an amplitude of 3.5 cm using a universal shaker, and the quantity of adhered dust was measured. A quantity of adhered dust of 1 g or more was evaluated as A, a quantity of at least 0.5 g but less than 1 g was evaluated as B, and a quantity less than 0.5 g was evaluated as C.

Stability Over Time. A sample of the oil was placed in a 300 g glass bottle and left to stand at room temperature for one week, and the external appearance of the oil was evaluated visually. Oils in which no sediment or component separation appeared were evaluated as A, oils which became hazy or in which a ring-like portion separated out were evaluated as B, and oils in which sediment or component separation appeared were evaluated as C.

Allergen Inactivation. Approximately 0.05 g of a dust containing mite allergens was dispersed on a plate, and this plate was then wiped with either an oil-treated mop or an untreated mop. Subsequently, the allergens were extracted from the oil-treated mop and the untreated mop, and the level of allergens was quantified using the ELISA method. The inactivation ratio was calculated using the formula: Inactivation ratio=100−(allergen quantity on the oil-treated mop as determined by ELISA)/(allergen quantity on the untreated mop as determined by ELISA), and oils with a ratio of at least 50% were evaluated as A, those with a ratio of at least 10% but less than 50% were evaluated as B, and those with a ratio of at least 0% but less than 10% were evaluated as C.

Ease of Wastewater Treatment (Water Separability). In a 100 ml measuring cylinder were placed 80 ml of water and 4 g of the oil, and the cylinder was then shaken up and down 10 times. The time taken (seconds) for the upper layer to return to 4 ml following shaking was measured. Oils for which this time was less than 120 seconds were evaluated as A, those for which the time was at least 120 seconds but less than 180 seconds were evaluated as B, those for which the time was at least 180 seconds were evaluated as C, and those oils which did not completely separate were evaluated as D.

INDUSTRIAL APPLICABILITY

An oil according to the present invention exhibits excellent dispersion or dissolution of the allergen inactivation component, and is useful as a dust adsorption oil for use with cleaning and wiping implements containing a dry fibrous substrate, and mats and the like.

The entire contents of all references described in the specification are incorporated by reference herein.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is

1. An oil for dust adsorption, comprising a base oil (A), a water-soluble allergen inactivation component (C) comprising a plant extract, and a nonionic surfactant (B), wherein the component (B) is present in an amount ranging from at least 10 mass % to 50 mass % and comprises an aliphatic alcohol alkylene oxide adduct (B1) and/or an aliphatic carboxylate ester (B2).

2. The oil for dust adsorption according to claim 1, wherein the component (B) is an aliphatic alcohol alkylene oxide adduct (B11) represented by a general formula (1):

$$R^1\text{—}(OA)_k\text{—}OH \quad (1)$$

(wherein, $R^1$ represents an aliphatic hydrocarbon group of 1 to 24 carbon atoms or an alicyclic hydrocarbon group of 3 to 24 carbon atoms, A represents an alkylene group of at least 2 carbon atoms, and k represents either 0 or an integer of 1 or greater, with an average value within a range from 1 to 50).

3. The oil for dust adsorption according to claim 2, wherein the component (B11) satisfies either a formula (2) or a formula (3), and a value of c determined from a formula (4) is no more than 1.0:

$$Mw/Mn \leqq 0.030 \times Ln(v) + 1.010 \text{ (wherein, } v<10) \quad (2)$$

$$Mw/Mn \leqq -0.026 \times Ln(v) + 1.139 \text{ (wherein, } v \geqq 10) \quad (3)$$

$$c = (v + n_0/n_{00} - 1)/[Ln(n_{00}/n_0) + n_0/n_{00} - 1] \quad (4)$$

(wherein, Mw represents a weight average molecular weight, Mn represents a number average molecular weight, v represents an average value of k in the general formula (1), Ln(v) represents a natural logarithm of v, $n_{00}$ represents a number of mols of aliphatic alcohol used in a synthesis reaction for the component (B1), and $n_0$ represents a number of mols of unreacted aliphatic alcohol).

4. The oil for dust adsorption according to claim 2, wherein the component (B11) is a compound of the general formula (1) in which A is an ethylene group, which also satisfies either a formula (5) or a formula (6):

$$Mw/Mn \leqq 0.030 \times Ln(v) + 1.010 \text{ (wherein, } v<10) \quad (5)$$

$$Mw/Mn \leqq -0.026 \times Ln(v) + 1.139 \text{ (wherein, } v \geqq 10) \quad (6)$$

(wherein, Mw represents a weight average molecular weight, Mn represents a number average molecular weight, v represents an average value of k in the general formula (1), and Ln(v) represents a natural logarithm of v).

5. The oil for dust adsorption according to claim 1, wherein a quantity of the component (C) within the oil for dust adsorption is within a range from 0.01 to 15% by mass.

6. The oil for dust adsorption according to claim 1, which exhibits a kinematic viscosity at 30° C. (a value measured using an Ubbelohde viscometer in accordance with JIS Z8803-1991, 5.2.3) within a range from 10 to 300 $mm^2/s$.

7. A fiber product for dust adsorption, which has been treated with the oil for dust adsorption according to claim 1.

* * * * *